(12) United States Patent
Angrick et al.

(10) Patent No.: US 10,343,550 B2
(45) Date of Patent: Jul. 9, 2019

(54) METHOD FOR CONTROLLING A HYBRID DRIVETRAIN AND BATTERY DEVICE IN THE HYBRID DRIVETRAIN

(71) Applicant: Schaeffler Technologies AG & Co. KG

(72) Inventors: Carsten Angrick, Appenweier (DE); Matthias Gramann, Renchen (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 73 days.

(21) Appl. No.: 15/208,260

(22) Filed: Jul. 12, 2016

(65) Prior Publication Data
US 2016/0339796 A1  Nov. 24, 2016

Related U.S. Application Data

(63) Continuation of application No. 14/039,657, filed on Sep. 27, 2013, now abandoned, which is a (Continued)

(30) Foreign Application Priority Data

Apr. 4, 2011 (DE) .......... 10 2011 016 012

(51) Int. Cl.
*B60L 50/51* (2019.01)
*B60K 6/28* (2007.10)
(Continued)

(52) U.S. Cl.
CPC .......... *B60L 50/51* (2019.02); *B60K 6/28* (2013.01); *B60K 6/485* (2013.01); *B60L 58/20* (2019.02);
(Continued)

(58) Field of Classification Search
CPC ...... H02J 7/0018; H02J 7/0019; H02J 7/0022; B60L 11/1803; B60L 11/1864;
(Continued)

(56) References Cited

U.S. PATENT DOCUMENTS

| | | | | |
|---|---|---|---|---|
| 4,313,080 A | * | 1/1982 | Park | B60L 11/14 180/65.225 |
| 4,674,609 A | * | 6/1987 | Sturges | F16D 48/066 192/103 F |

(Continued)

FOREIGN PATENT DOCUMENTS

| | | |
|---|---|---|
| CN | 102055042 | 5/2011 |
| DE | 19532163 A1 | 3/1997 |

(Continued)

*Primary Examiner* — Thomas E Worden
(74) *Attorney, Agent, or Firm* — Brooks Kushman P.C.

(57) ABSTRACT

A circuit for controlling a hybrid drivetrain, including an alternating current electric machine, a first battery, a second battery, a first pair of complementary transistor switches arranged to complete a first direct current circuit to charge the first battery or to complete a second direct current circuit to discharge the first battery, a second pair of complementary transistor switches arranged in parallel and arranged to complete a third direct current circuit to charge the second battery or to complete a fourth direct current circuit to discharge the second battery, an inverter arranged to convert direct current electrical energy from the first and second batteries into alternating current electrical energy, arranged to supply the alternating current electrical energy to the electric machine, and also arranged to transmit voltage modulations caused by damping vibrations within the drivetrain, and a control unit operatively arranged to control the first and second pair of switches.

13 Claims, 4 Drawing Sheets

Related U.S. Application Data continuation of application No. PCT/DE2012/000243, filed on Mar. 12, 2012.

(51) Int. Cl.
    *B60K 6/485*     (2007.10)
    *B60W 10/08*     (2006.01)
    *B60W 10/26*     (2006.01)
    *B60W 30/20*     (2006.01)
    *B60W 10/06*     (2006.01)
    *B60W 20/13*     (2016.01)
    *B60W 20/00*     (2016.01)
    *B60L 58/21*     (2019.01)
    *B60L 58/20*     (2019.01)

(52) U.S. Cl.
    CPC ............. *B60L 58/21* (2019.02); *B60W 10/06* (2013.01); *B60W 10/08* (2013.01); *B60W 10/26* (2013.01); *B60W 20/00* (2013.01); *B60W 20/13* (2016.01); *B60W 30/20* (2013.01); *B60L 2210/30* (2013.01); *B60L 2210/42* (2013.01); *B60L 2270/145* (2013.01); *B60W 2030/206* (2013.01); *B60W 2510/244* (2013.01); *B60Y 2300/65* (2013.01); *B60Y 2400/112* (2013.01); *Y02T 10/6226* (2013.01); *Y02T 10/6278* (2013.01); *Y02T 10/7011* (2013.01); *Y02T 10/7061* (2013.01); *Y02T 10/7066* (2013.01); *Y10S 903/907* (2013.01); *Y10S 903/93* (2013.01)

(58) Field of Classification Search
    CPC .............. B60L 11/1868; B60L 2210/30; B60L 2210/42; B60L 2270/145; B60W 20/13; B60W 10/06; B60W 10/08; B60W 10/26; B60W 30/20; B60W 2030/206; B60W 2510/244; B60K 6/28; B60K 6/485; B60Y 2300/65; B60Y 2400/112; Y02T 10/6226; Y02T 10/6278; Y02T 10/7011; Y02T 10/7061; Y02T 10/7066; Y10S 903/907; Y10S 903/93
    See application file for complete search history.

(56) References Cited

U.S. PATENT DOCUMENTS

| | | | | |
|---|---|---|---|---|
| 5,359,308 A * | 10/1994 | Sun | ............................ | B60K 6/28 180/65.25 |
| 5,397,991 A * | 3/1995 | Rogers | ................ | B60L 11/1861 320/125 |
| 5,602,459 A * | 2/1997 | Rogers | ................ | B60L 11/1861 320/134 |
| 5,749,909 A | 5/1998 | Schroeppel et al. | | |
| 6,138,629 A * | 10/2000 | Masberg | ................ | B60K 6/26 123/192.1 |
| 6,161,640 A * | 12/2000 | Yamaguchi | ............ | B60K 6/445 180/197 |
| 6,184,659 B1 | 2/2001 | Darmawaskita | | |
| 6,310,523 B1 | 10/2001 | Chen et al. | | |
| 6,487,998 B1 * | 12/2002 | Masberg | ................. | B60L 7/003 123/192.1 |
| 7,838,142 B2 | 11/2010 | Scheucher | | |
| 8,030,880 B2 * | 10/2011 | Alston | ............... | B60H 1/00428 320/103 |
| 8,863,540 B2 * | 10/2014 | Alston | ............... | B60H 1/00428 165/43 |
| 8,981,710 B2 * | 3/2015 | Hintz | .................... | B60L 11/005 320/103 |
| 9,331,498 B2 * | 5/2016 | Albsmeier | ............ | H02J 7/1423 |
| 2003/0090235 A1 | 5/2003 | Tsuji | | |
| 2004/0262062 A1 | 12/2004 | Berbari | | |
| 2005/0253543 A1 * | 11/2005 | Soudier | .................... | H02P 21/05 318/432 |
| 2007/0188137 A1 | 8/2007 | Scheucher | | |
| 2008/0051249 A1 | 2/2008 | Maenner et al. | | |
| 2008/0284375 A1 * | 11/2008 | Nagaoka | ............. | B60L 11/1855 320/116 |
| 2008/0303580 A1 | 12/2008 | Stegmayr | | |
| 2009/0033252 A1 * | 2/2009 | Smith | ................. | B60L 11/1868 318/139 |
| 2009/0087722 A1 * | 4/2009 | Sakabe | ................. | B60L 3/0046 429/61 |
| 2010/0038473 A1 | 2/2010 | Schneider et al. | | |
| 2010/0055546 A1 | 3/2010 | Elder et al. | | |
| 2010/0136390 A1 * | 6/2010 | Ueda | .................... | H01M 10/441 429/61 |
| 2010/0194339 A1 | 8/2010 | Yang et al. | | |
| 2010/0199792 A1 * | 8/2010 | Werner | .................... | F16H 3/006 74/330 |
| 2011/0076525 A1 | 3/2011 | Zhang et al. | | |
| 2011/0149611 A1 * | 6/2011 | Moussaoui | ....... | H02M 3/33584 363/21.04 |
| 2011/0225124 A1 * | 9/2011 | Agombar | ................ | G06F 3/061 707/639 |
| 2011/0241622 A1 | 10/2011 | Li et al. | | |
| 2011/0248677 A1 | 10/2011 | Shimizu | | |
| 2011/0309799 A1 | 12/2011 | Firehammer | | |
| 2012/0119591 A1 * | 5/2012 | Sun | ........................ | C25D 11/00 307/154 |
| 2012/0185121 A1 * | 7/2012 | Umehara | ................. | B60L 15/20 701/22 |
| 2012/0268058 A1 * | 10/2012 | Enoki | .................... | B60R 16/033 320/104 |
| 2013/0046427 A1 | 2/2013 | Hohenberg | | |
| 2014/0167654 A1 * | 6/2014 | Brockerhoff | .............. | H02P 7/00 318/139 |
| 2015/0377352 A1 * | 12/2015 | Herkommer | ........... | F16H 63/20 74/333 |

FOREIGN PATENT DOCUMENTS

| | | |
|---|---|---|
| DE | 19709134 A1 | 9/1998 |
| DE | 19709299 A1 | 9/1998 |
| EP | 0876554 | 11/1998 |
| WO | 9708439 A1 | 3/1997 |
| WO | 9839579 A2 | 9/1998 |

\* cited by examiner

METHOD FOR CONTROLLING A HYBRID DRIVETRAIN AND BATTERY DEVICE IN THE HYBRID DRIVETRAIN

CROSS-REFERENCE TO RELATED APPLICATIONS

This application is filed under 35 U.S.C. §§ 120 and 365(c) as a continuation of U.S. patent application Ser. No. 14/039,657 filed on Sep. 27, 2013, which application is a continuation of International Patent Application No. PCT/DE2012/000243 filed Mar. 12, 2012, which application claims priority from German Patent Application No. 10 2011 016 012.4 filed Apr. 4, 2011, which applications are incorporated herein by reference in their entireties.

FIELD OF THE INVENTION

The invention relates to a method for controlling a hybrid drivetrain in a motor vehicle having an internal combustion engine, which has a crankshaft and an electric machine which can be operated as a motor and a generator, having a rotor operatively connected to the crankshaft, having a torsional vibration damper operatively connected to the crankshaft, having a battery device for exchanging electrical energy with the electric machine, and having a control unit for controlling the battery device and the electric machine, and a corresponding battery device.

BACKGROUND OF THE INVENTION

Hybrid drivetrains are known from series applications in motor vehicles. These hybrid drivetrains employ, for example, an electric machine, which serves as a starter for the combustion engine, as an additional or part-time solitary drive, and for recovering the kinetic energy of the motor vehicle, as a motor and generator; the electric machine being operatively connected to a battery device, which stores and emits electrical energy.

A device for reducing non-uniformities of rotation of a combustion engine is also known from German Patent No. 197 09 299 A1, where half-waves from the electric machine switched to generator operation which lie above a mean torque of the combustion engine are damped and the released energy is stored in the battery unit, and the electric machine is driven to fill out half-waves lying below a mean torque, energy being taken from the battery device. All-in-all, the charging and discharging currents which occur here at the battery device in the rhythm of the non-uniformities of rotation of the combustion engine are high, so that the battery device may not have sufficient recharging kinetics and is damaged in the course of time due to the recharging.

Furthermore, the non-uniformities of rotation, such as torsional vibrations in modern combustion engines are so high, for example, due to downsizing and the like, that traditionally employed torsional vibration dampers meet their capacity limits.

BRIEF SUMMARY OF THE INVENTION

The object of the invention is therefore to operate a hybrid drivetrain in such a way that, on the one hand, the torsional vibrations of the combustion engine are damped in a satisfactory manner, and, on the other hand, the battery device is spared. The object of the invention is also to design a corresponding battery device so that it has longer and better functionality, for example, with high-frequency recharging processes between charging and discharging.

The object is fulfilled by a method for controlling a hybrid drivetrain in a motor vehicle, having an internal combustion engine, which has a crankshaft and an electric machine, which can be operated as a motor and generator, having a rotor operatively connected to the crankshaft, having a torsional vibration damper operatively connected to the crankshaft, having a battery device for exchanging electrical energy with the electric machine, and having a control unit for controlling the battery device and the electric machine, the electric machine being operatively connected to at least first and second electric batteries of the battery device, and at least part of the time being charged in the rhythm of occurring residual vibrations of the torsional vibration damper of one of the batteries, while the other is being discharged. For example, to damp the residual vibrations of the torsional vibration damper through the alternating operation of the electric machine in motor and generator mode, the recharging currents, which occur with high frequency at the battery device, can be controlled such that one battery is only charged and the other is only discharged. Such an operating mode helps to conserve the batteries in the battery device, thereby prolonging their service life.

To take account of a charge or discharge state of the batteries, there is also a provision to switch them to a charging or discharging mode, independent of their charged condition, by the control unit, whose function may be provided in one or more physical control devices and control units. In this connection, technically known devices, for example, devices that are already present in the batteries in an advantageous manner to determine the charged condition, can be conveyed to the control unit, which controls in particular the charging and discharging currents for operating the electric machine which damps the residual vibrations. It is understood that during the operating states of the electric machine, for example, during the start, a recovery or the like, both batteries may also be simultaneously charged or discharged. Furthermore, damping of the residual vibrations by means of the electric machine may also be suspended if the charge state or operating condition of the batteries falls below a specified residual charge or residual capacity, for example, at very low temperatures, during long drives with the support of the electric machine or the like.

In this connection, besides controlling the battery unit, the control unit controls the electric machine, while the battery switched to the charging state is charged by means of half-waves that lie above a mean torque of the residual vibrations, which are converted to electrical energy by driving the electric machine, and the battery switched to the discharging state drives the electric machine by half-waves that lie below a mean torque of the residual vibrations to compensate. The operating data for controlling the electric machine and the battery device are provided by corresponding sensor devices for detecting rotational characteristics such as angles of rotation and their temporal derivatives from shafts such as the crankshaft of the combustion engine, the transmission input shaft(s) of a gear unit, the rotor shaft of the electric machine, inner variables of the engine controller of the combustion engine such as engine characteristics, upper dead-center position and the like.

The object is also fulfilled by a battery device for carrying out the proposed method in a hybrid drivetrain which has first and second batteries which are alternately connectible by means of current-direction-sensitive switches and a control unit for connecting the switch, as well as an inverter. In this case, the minus pole is preferably grounded and the plus pole is connected by means of the switch. Alternatively, the grounding paths of the batteries can be connected by means of the proposed switches. To this end, the control unit issues a control signal in a preferred manner to two alternately switching logic switches, which switch the switches themselves, where in a preferred embodiment a switch for the charging current and a switch for the discharging current are provided at each plus pole, and these are alternately switched contrary to each other. In order to damp the residual vibrations of the torsional vibration damper, the switches are switched alternately with reference to the batteries, so that only one battery is charged and the other is discharged. If the electric machine is to start the combustion engine in motor mode or to deliver additional drive torque in a boost mode, the discharge switches of both batteries can be switched and the charge switches deactivated. In the case of recovery with the motor vehicle in deceleration mode, on the other hand, the charge switches of both batteries can be switched and the discharge switches deactivated. It is understood that the connection layout of the switches can be designed so that, for example, for simultaneous discharging or simultaneous charging of both batteries the switches can be switched accordingly, for example, the charge switches and the discharge switches can be connected simultaneously.

In an embodiment of a battery device, devices may be provided in each of the batteries to ascertain the charge state, which have a signal connection to the control unit and report the present charge state of the batteries, right down to individual charge states of the battery cells. The control unit registers the charge states and determines a charging plan for the various operating states of the motor vehicle, for example, for damping the residual vibrations of the torsional vibration damper by means of the electric machine. The control unit registers and/or obtains for this purpose data for appraising the operating states, for example, starting the combustion engine, shifting the transmission, compression and acceleration modes of the motor vehicle and the like.

The switches may be made, for example, of active electronic components, e.g., MOSFETs (metal-oxide-semiconductor field-effect transistors). However, IGBTs (insulated-gate bipolar transistors) have proven to be advantageous, which, in contrast to MOSFETs, block completely against the switching direction due to the absence of suppressor diodes.

Lead storage batteries and the like may be used, for example, as the batteries. However, lithium-ion batteries have proven advantageous due to their favorable power-to-weight ratio and their time-dependent charging and discharging behavior. Connecting the latter by means of the switches prevents damage, which can occur, for example, due to subjecting them to micro-cycles, as are necessary when damping residual vibrations by means of the electric machine. Due to the currents that are directed through the inverter and the switches into the corresponding battery in only one direction of flow, long charging cycles are produced, which can be set as macro-cycles for each battery, from a low charge state up to a prescribed charge state. When the batteries are designed with the same capacity, each battery may be charged alternately to approximately the maximum capacity.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
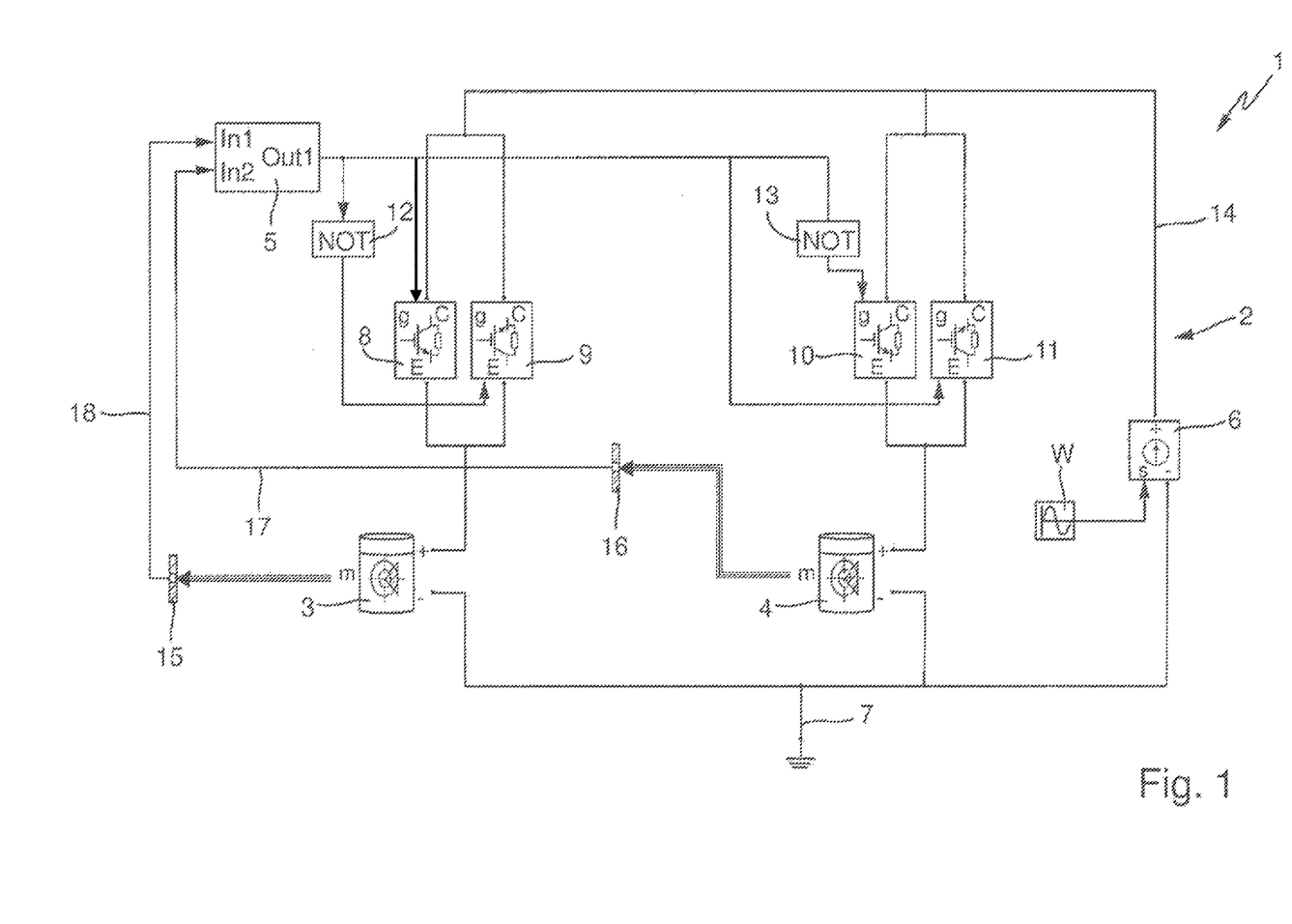
FIG. 1 is a circuit diagram for controlling the charge states of batteries of a battery device.

FIG. 1 shows circuit diagram 2 of battery device 1, having first and second batteries 3, 4 with the same or different capacity, control unit 5 and inverter 6, which are connected to each other by means of grounding line 7. Inverter 6 forms the interface to the electric machine (not shown), and transforms the direct current of batteries 3, 4 into a plurality of alternating current phases, of which only one phase w is depicted here symbolically, to drive the electric machine.

Situated between inverter 6 and batteries 3, 4 in each case are two parallel-switched switches 8, 9, 10, 11 in the form of IGBTs, connected oppositely in regard to their switch position, so that with gates of switches 8, 9, 10, 11 connected in each case with the same signal level through logic switches 12, 13, in each case one switch of battery 3, 4 is switched to conductive and the other to non-conductive. In this case, the gates are connected so that, for example, at battery 3, when a positive level is present at output Out1 of control unit 5, switch 8 of battery 3 and switch 11 of battery 4 are switched so that when an AC signal is present at access line 14 only battery 3 receives charging current through closed switch 8, while switch 10 which is responsible for the charging current of battery 4 remains open. In regard to discharge current, switch 9 of battery 3 is open, and a discharge current is able to flow from battery 4 through closed switch 11.

If the level at output Out1 is set to low, inversely switched logic switches 12, 13 issue a level to the gates of switches 9, 10, so that the discharge current from battery 3 and the charge current for battery 4 are switched through switches 9 and 10, respectively, while switches 8, 11 remain open.

The connection of output Out1 of control unit 5 is dependent on the charge states ascertained in batteries 3, 4 by devices 15, 16, which are made up of the charge states of the individual cells and are fed to inputs In1, In2 of control unit 5 by means of signal lines 17, 18.

Figure 2:
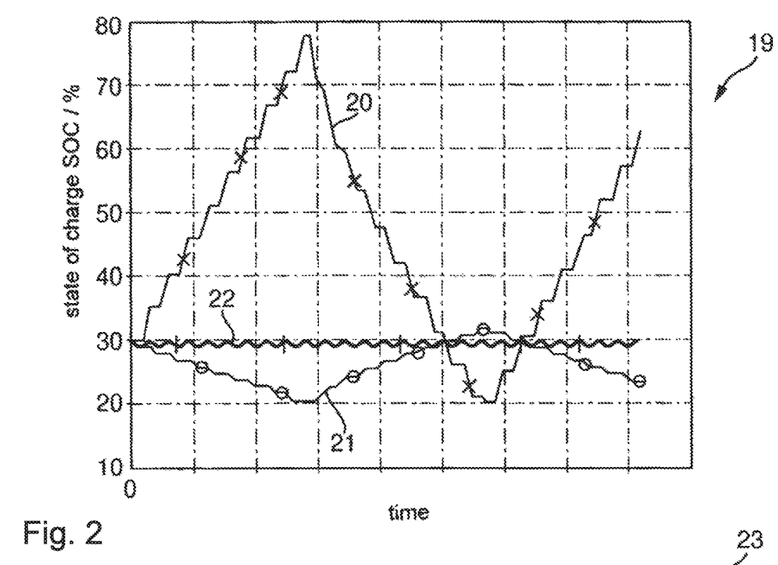
FIG. 2 is a depiction of charging processes of a conventional battery device having a battery and the battery device of the present invention, over time.

FIG. 2 shows diagram 19, in which curves 20, 21, 22 represent the charge states of batteries against time in the range of, for example, several minutes to several hours, where these charge states may vary and depend among other things on the capacity of the batteries and their electrode kinetics. The actual excitations of the drivetrain, which the torsional vibration damper in the drivetrain does not damp adequately, cause small waves in the range of approximately 100 Hz in the DC section which is downline from the inverter. The depiction of the long-term charging process and the depiction of the AC portion of the excitations are shown overdrawn in Diagram 19 to explain the effects.

Curve 22, identified using the symbols '+,' shows a conventional battery device having a charge state of approximately 30% during a compensation of residual vibrations of a torsional vibration damper by means of an electric machine, which is connected to the single battery of the battery device. The battery is charged and discharged here using micro-cycles, which may lie within the range of the frequency of the occurring residual vibrations of the torsional vibration damper. The battery may be damaged by such micro-cycles and have a short service life.

Curves 20, 21, identified using the symbols 'x' and 'o', respectively, show the charge states of battery device 1 of FIG. 1, first and second batteries 3, 4 having different capacities—as is evident from FIG. 2. The connection of batteries 3, 4 in accordance with circuit diagram 2 results in the uniform charging and discharging of the batteries over macro-cycles, which can be made to approximate the charging and discharging processes recommended by the manufacturer. In this case, the battery with curve 20 has the smaller capacity, so that it determines the macro-cycles, which may range from a few minutes to a few hours in length. The charge states are measured at the batteries and are registered by control unit 5, which controls the switching of switches 8, 9, 10, 11 to adjust the macro-cycles. In one embodiment, the battery with curve 20 is charged up to a charge state of 80% of the total capacity and discharged to 20% thereof, which results in a recharging of between 20% and 32% of its total capacity for the battery having the greater capacity.

Figure 3A:
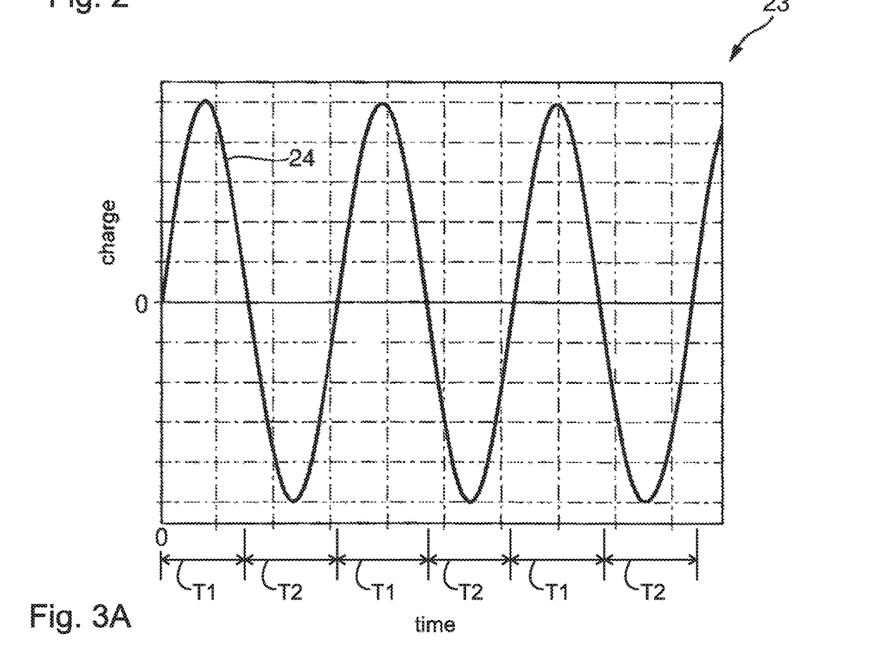
FIG. 3A is a depiction of the currents appearing in a hybrid drivetrain during a compensation of residual vibrations of a torsional vibration damper at a conventional battery device over time.
Figure 3B:
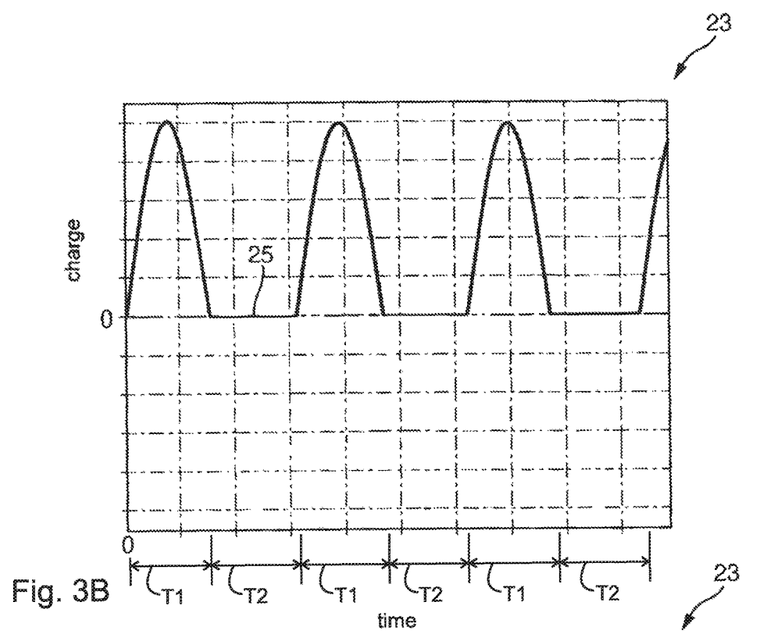
FIG. 3B is a depiction of a single electrical machine alternately charging a first battery and discharging a second battery over time.
Figure 3C:
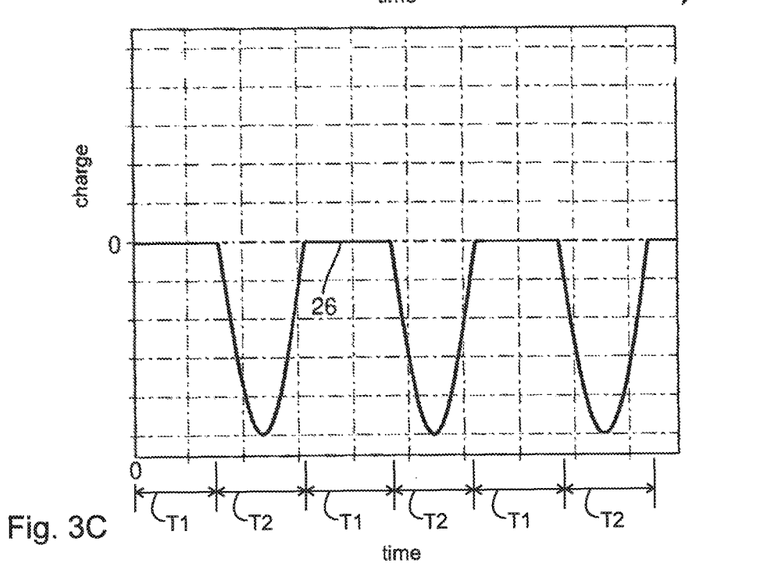
FIG. 3C is a depiction of a single electrical machine alternately discharging a first battery and charging a second battery over time; and, FIG. 4 is a circuit diagram similar to the circuit diagram of FIG. 1 for controlling the charge state of batteries of a battery device.

FIG. 3A shows diagram 23, with currents occurring cyclically at battery devices during the compensation of residual vibrations of a torsional vibration damper by means of an electric machine connected to the batteries of the battery devices, over time. FIG. 3B is a depiction of a single electrical machine alternately charging a first battery and discharging a second battery over time. In FIG. 3A, curve 24 shows the currents of a conventional battery device having a single battery, which is recharged micro-cyclically at the frequency of the alternating currents. In FIG. 3B and FIG. 3C, batteries connected in accordance with circuit diagram 2 of FIG. 1, on the other hand, are only charged or discharged, so that over a relatively long macro-cycle they undergo only positive or negative current cycles, as may be seen from curves 25, 26 which each show the current of one battery. Curve 25 shows current for one of batteries 3 or 4 during a first plurality of time periods T1 in which residual torque from the crankshaft and torsional vibration damper is greater than a mean for the residual torque. During time periods T1, electric machine 27 is controlled by control unit 5 to operate as a generator by charging the one of batteries 3 or 4. Curve 26 shows current for the other of batteries 3 or 4 during a second plurality of time periods T2 in which residual torque from the crankshaft and torsional vibration damper is greater than a mean for the residual torque. During time periods T2, electric machine 27 is controlled by control unit 5 to operate as a motor by discharging the other of batteries 3 or 4.

Figure 4:
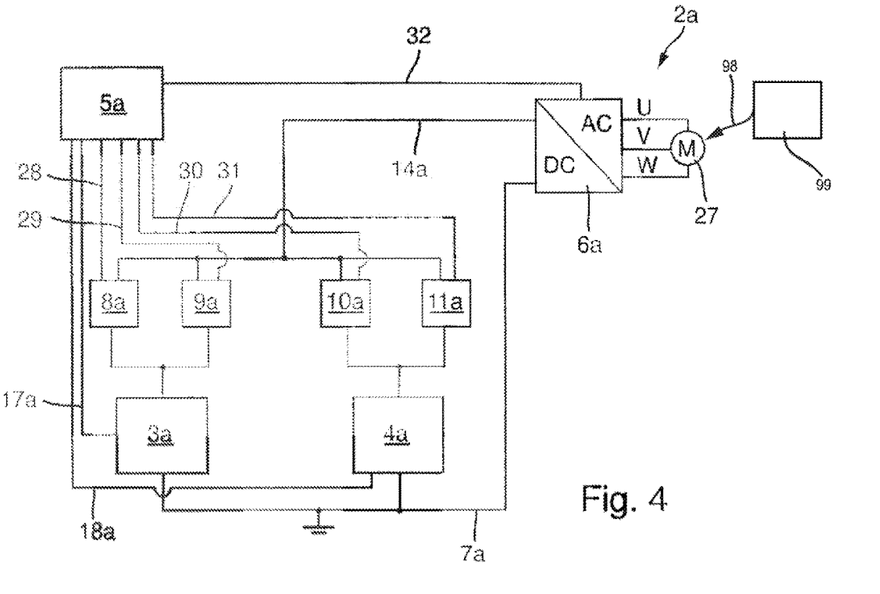

FIG. 4 shows circuit diagram 2a of first and second batteries 3a, 4a with the same or different capacity, control unit 5a and inverter 6a, which are connected to each other by means of grounding line 7a and access line 14a. Inverter 6a forms the interface to electric machine 27, and converts the DC current of batteries 3a, 4a to a plurality of AC phases u, v, w to drive electric machine 27. At the same time, phase-selective commutation currents or commutation voltages in the range from 100 Hz to 1 kHz are output, while the voltage modulations received from the residual vibrations 98 of the torsional vibration damper 99 via electric machine 27 are transmitted via inverter 6a to the DC network, i.e., via access line 14a and grounding line 7a to the batteries, lie within the range from approximately 60 to 100 Hz. Switches 8a, 9a, 10a, 11a are addressed directly by control unit 5a by means of control lines 28, 29, 30, 31, and are thereby placed in a through-connected or open state.

Because of the free design of the connection of switches 8a, 9a, 10a, 11a by control unit 5a, one of batteries 3a, 4a can be charged while the other is being discharged. To this end, for example, switch 8a is connected through in the direction of battery 3a and switch 11a is connected through in the direction of inverter 6a, while switches 9a, 10a are open. This causes battery 3a to be charged and battery 4a to be discharged. By closing switches 8a, 10a in the same direction, both batteries 3a, 4a are charged, for example, during recovery of the drivetrain while the motor vehicle is decelerating, and by closing switches 9a, 11a in the same direction both batteries 3a, 4a are discharged simultaneously, for example, while starting the combustion engine or when the drivetrain is in boost mode.

Control unit 5a has a signal connection to batteries 3a, 4a and inverter 6a by means of signal lines 17a, 18a, 32, and thereby controls the charging of the batteries and the commutation of electric machine 27.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

LIST OF REFERENCE NUMBERS

1 battery device
2 circuit diagram
2a circuit diagram
3 battery 3a battery
4 battery
4a battery
5 control unit
5a control unit
6 inverter
6a inverter
7 grounding line
7a grounding line
8 switch
8a switch
9 switch
9a switch
10 switch
10a switch
11 switch
11a switch
12 logic switch
13 logic switch
14 access line
14a access line
15 device
16 device
17 signal line
17a signal line
18 signal line
18a signal line
19 diagram
20 curve
21 curve
22 curve
23 diagram
24 curve
25 curve
26 curve
27 electric machine
28 control line
29 control line
30 control line
31 control line
32 signal line
In1 input
In2 input
Out1 output
u phase
v phase
w phase

What is claimed is:

1. A circuit for controlling a hybrid drivetrain and a pair of batteries in the hybrid drivetrain of a motor vehicle, comprising:
an alternating current electric machine arranged to drive said hybrid drivetrain at least some of the time;
a first battery arranged to provide direct current electrical power; a second battery arranged to provide direct current electrical power;
a first pair of complementary transistor switches arranged in parallel and arranged to complete a first direct current circuit to charge said first battery or to complete a second direct current circuit to discharge said first battery;
a second pair of complementary transistor switches arranged in parallel and arranged to complete a third direct current circuit to charge said second battery or to complete a fourth direct current circuit to discharge said second battery;
an inverter arranged to convert direct current electrical energy from said first and second batteries into alternating current electrical energy, arranged to supply said alternating current electrical energy to said electric machine, and also arranged to transmit modulations responsive to residual vibrations from a torsional vibration damper within said drivetrain to one of said first, second, third, or fourth direct current circuits via one of said switches; and,
a control unit operatively arranged to control said first and second pair of switches.

2. The circuit recited in claim 1, wherein said modulations responsive to said residual vibrations lie in a range of 60 to 100 Hz.

3. The circuit recited in claim 1, wherein said control unit is operatively arranged to control said first and second pair of switches such that said first battery is charging when said second batter is discharging.

4. The circuit recited in claim 1, wherein said control unit is operatively arranged to control said first and second pair of switches such that said second battery is charging when said first battery is discharging.

5. The circuit recited in claim 1, wherein said control unit is operatively arranged to control said first and second pair of switches such that said first battery is charging and said second battery is charging during recovery of the drivetrain while the motor vehicle is decelerating.

6. The circuit recited in claim 1, wherein said control unit is operatively arranged to control said first and second pair of switches such that said first battery is discharging and said second battery is discharging while starting a combustion engine of the motor vehicle, or when the drivetrain is in a boost mode.

7. The circuit recited in claim 1, wherein each of said transistor switches comprises an insulated-gate bipolar transistor.

8. A method for controlling a hybrid drivetrain of a motor vehicle, said motor vehicle driven at least some of the time by an electric machine, comprising:
powering said electric machine to drive said hybrid drivetrain at least some of the time with a first battery;
powering said electric machine to drive said hybrid drivetrain at least some of the time with a second battery;
charging and discharging said first and second batteries via a direct current circuit;
inverting direct current electrical energy provided by at least one of said batteries into alternating current electrical energy to power said electric machine;
transmitting modulations responsive to residual vibrations from a torsional vibration damper within said drivetrain into said direct current charging circuit;
controlling, with a control unit, a first pair of complementary transistor switches arranged in parallel and arranged to complete a circuit to charge said first battery or to complete a circuit to discharge said first battery; and,
controlling, with the control unit, a second pair of complementary transistor switches arranged in parallel and arranged to complete a circuit to charge said second battery or to complete a circuit to discharge said second battery.

9. The method recited in claim 8, wherein said modulations responsive to said residual vibrations lie in a range of 60 to 100 Hz.

10. The method recited in claim 8, wherein, in a first stage, said controlling steps function to charge said first battery when said second battery is discharging.

11. The method recited in claim 8, wherein, in a second stage, said controlling steps function to charge said second battery when said first battery is discharging.

12. The method recited in claim 8, wherein, in a third stage, said controlling steps function to charge said first and second batteries at the same time.

13. The method recited in claim 8, wherein, in a fourth stage, said controlling steps function to discharge said first and second batteries at the same time.

* * * * *